UNITED STATES PATENT OFFICE 2,431,403

POLYMERIZATION OF BUTADIENE

Herbert L. Johnson, Media, Hans G. Voelker, Philadelphia, and Archibald P. Stuart, Norwood, Pa., assignors to Sun Oil Company, Philadelphia, Pa., a corporation of New Jersey No Drawing. Application December 28, 1945, Serial No. 637,786

8 Claims. (Cl. 260—666)

This invention relates to the polymerization of butadiene and certain of its derivatives employing for this purpose a contact mass consisting essentially of a fused alumina to obtain materially higher yields of products, particularly dimer products, than have been obtained heretofore with other contact masses. More particularly, the invention relates to the treatment at an elevated temperature of butadiene, butadiene having one or two methyl groups, or mixtures of these compounds, in the presence of a contact mass consisting essentially of a fused alumina to obtain materially higher yields of polymerization products, particularly dimer products, than have been heretofore obtained with other contact masses. A particularly important advantage and characteristic feature of the invention resides in the fact that with the use of a fused alumina as contact mass the course of the polymerization reaction can be directed, under certain hereinafter specified conditions, to yield predominantly the dimer products to the substantial exclusion of materials boiling either higher or lower than said product and in some instances to form no material boiling at a lower temperature than the dimer product.

Contact masses which have been employed heretofore to polymerize butadiene and its homologues have been found to give yields of polymer products which are substantially lower than those which can be obtained employing a fused alumina according to this invention. Furthermore, the contact masses heretofore employed have been found not to exhibit the directive influence or effect obtained with fused alumina, as described above, namely that substantially all the product formed consists of the dimer product and especially that it is possible to obtain the dimer product, under certain conditions, to the absolute exclusion of the formation of materials boiling lower than the boiling temperature of the dimer product.

Thus, according to the invention, there is provided a novel process for the treatment of a butadiene compound at an elevated temperature with a contact mass consisting essentially of a fused alumina to obtain yields of polymerization products which are substantially higher than any yields heretofore obtained, as well as a process for the treatment of a butadiene compound at an elevated temperature and certain other conditions, hereinafter disclosed, to obtain high yields of substantially the dimer product and in some cases, under still more specific conditions, to obtain the dimer product to the absolute exclusion of any materials boiling lower than the boiling temperature of the dimer product and to the substantial exclusion of materials boiling higher than the dimer product.

Herein and in the claims the term "butadiene compound" includes butadiene, butadiene having one or two methyl groups, or mixtures thereof. Since the invention is pre-eminently suited to the treatment of butadiene it will now be more fully described with reference thereto, particularly with respect to its polymerization or dimerization to vinylcyclohexene.

The temperature at which the contact mass is employed can be varied considerably. However, for the polymerization, generally, a temperature within the range 350° C.–450° C. will be employed. For the dimerization the temperature will be within the range 375° C.–425° C., and will be preferably about 400° C.

The pressure at which the polymerization or dimerization reaction is effected is important. For the polymerization reaction, generally, a pressure within the range atmospheric to about 200 lbs./sq. in. gauge will be employed. For the dimerization reaction a pressure within the range 15 lbs./sq. in.–75 lbs./sq. in. will be employed and will be preferably about 35 lbs./sq. in.

Generally a rate within the range 2–8 grams/minute/100 grams of contact mass will be employed for the polymerization reaction. For the dimerization reaction a rate within the range 3–6 grams/minute/100 grams contact mass will be employed and the rate will be preferably within the range 4–5 grams/minute/100 grams contact mass.

As stated, a characteristic feature of the invention is that it is possible under the herein disclosed conditions to substantially dimerize the charging material, that is, it is possible to polymerize to the dimer product with little or no formation of lower boiling materials or substantial formation of higher boiling materials. As a result of this characteristic of the invention high yields of products, particularly, the dimer products, can be obtained and on recycling any unconverted charging material these already high yields can be substantially increased since loss through undesirable materials boiling lower and higher than the desired products is greatly minimized.

As stated, the contact mass employed according to the invention is essentially fused alumina. A fused alumina which has been found suited to the practice of the invention is sold in the trade under the name "Alfrax." Obviously equivalent fused aluminas can be employed. The contact mass is preferably in a sub-divided state. Particle sizes ranging from 4-5 mesh have been employed. Other mesh sizes can be employed the essential condition being good contact between the butadiene compound and the contact mass. Also, the contact mass should not cause too great a pressure drop through the conversion tube for practical operation reasons.

In use, some coke or heavier polymer materials will eventually accumulate upon the contact mass. This can easily be burned off employing methods well known in the art and the mass can be used almost indefinitely.

The following table illustrates results obtained with contact masses other than fused alumina and with fused alumina.

Table

| Contact Mass | Temp., °C. | Press. lbs. per sq. per in. gauge | Rate gms. per min. per 100 grams contact mass | Yields, Per Cent | | | | | Total Recovery |
|---|---|---|---|---|---|---|---|---|---|
| | | | | Unconverted Butadiene | Boiling below vinylcyclohexene | Vinylcyclohexene | Boiling above vinylcyclohexene | Recycle vinylcyclohexene | |
| Activated Alumina ("Alco" Grade A 4-8 Mesh) | 375 | 60 | 4.7 | 36.0 | 7.3 | 4.2 | 24.4 | 6.5 | 71.9 |
| Do | 400 | 60 | 5.1 | 21.4 | 9.9 | 1.2 | 26.2 | 1.5 | 58.7 |
| Porous Clay Plate (10 Mesh) | 375 | 60 | 5.0 | 68.7 | 1.3 | 6.4 | 9.6 | 15.3 | 86.0 |
| Do | 400 | 60 | 5.4 | 61.1 | 1.5 | 14.5 | 14.0 | 38.1 | 91.1 |
| Fused Alumina ("Alfrax" 4-5 Mesh) | 400 | 60 | 5.8 | 34.9 | 3.0 | 37.6 | 14.2 | 56.8 | 89.7 |
| Do | 400 | 35 | 4.2 | 57.7 | 0 | 28.2 | 4.9 | 65.7 | 90.6 |

It can be noted at the outset that at temperatures within the range claimed herein activated alumina gives extremely poor yields relative to those obtained with fused alumina. Even porous clay plate, considered to be an efficient contact mass, yields poor results relative to those obtained with fused alumina.

It is also to be noted, that owing to the characteristic feature of the invention, namely that undesired products can be avoided, that the recycle yields are substantially higher when using fused alumina than the other contact masses. This is a material and substantial improvement not foreseeable especially in view of the extremely poor performance of activated alumina.

It will be obvious to those skilled in the polymerization art that modification and variation are possible within the scope of the invention the essence of which is that a butadiene compound can be polymerized, at elevated temperatures employing a contact mass consisting essentially of fused alumina, in yields exceeding by such an amount the yields heretofore obtainable with other contact masses, and in certain circumstances without the formation of materials boiling at a temperature lower than the boiling temperature of the dimer product, as to amount to unpredictable results.

We claim:

1. The treatment of a butadiene compound at a temperature within the range 350° C.–450° C. with a contact mass consisting essentially of fused alumina.

2. The treatment of a butadiene compound at a temperature within the range 350° C.–450° C. and at a pressure within the range atmospheric to about 200 lbs./sq. in. with a contact mass consisting essentially of fused alumina.

3. The treatment according to claim 2 wherein the compound is charged at a rate of 2–8 grams/minute/100 grams contact mass.

4. The treatment according to claim 2 wherein the butadiene compound is butadiene.

5. The treatment of a butadiene compound at a temperature within the range 375° C.–425° C. and at a pressure within the range 15 lbs./sq. in.–75 lbs./sq. in. with a contact mass consisting essentially of fused alumina at a charging rate within the range 3–6 grams/minute/100 grams contact mass.

6. The treatment according to claim 5 wherein the butadiene compound is butadiene, the temperature selected is about 400° C., the pressure selected is about 35 lbs./sq. in. and the charging rate is 4–5 grams/minute/100 grams contact mass.

7. The treatment according to claim 2 wherein the butadiene compound is a methyl butadiene.

8. The treatment according to claim 2 wherein the butadiene compound is a dimethyl butadiene.

HERBERT L. JOHNSON.
HANS G. VOELKER.
ARCHIBALD P. STUART.

REFERENCES CITED

The following references are of record in the file of this patent:

UNITED STATES PATENTS

| Number | Name | Date |
|---|---|---|
| 2,355,392 | Oberfell | Aug. 8, 1944 |
| 2,376,985 | Voorhees | May 29, 1945 |
| 2,398,930 | Gary | Apr. 23, 1946 |

FOREIGN PATENTS

| Number | Country | Date |
|---|---|---|
| 343,116 | Great Britain | Feb. 16, 1931 |